L. E. JENNISON.
MICROMETER HEIGHT GAGE.
APPLICATION FILED JULY 10, 1920.
1,390,618.
Patented Sept. 13, 1921.
2 SHEETS—SHEET 2.
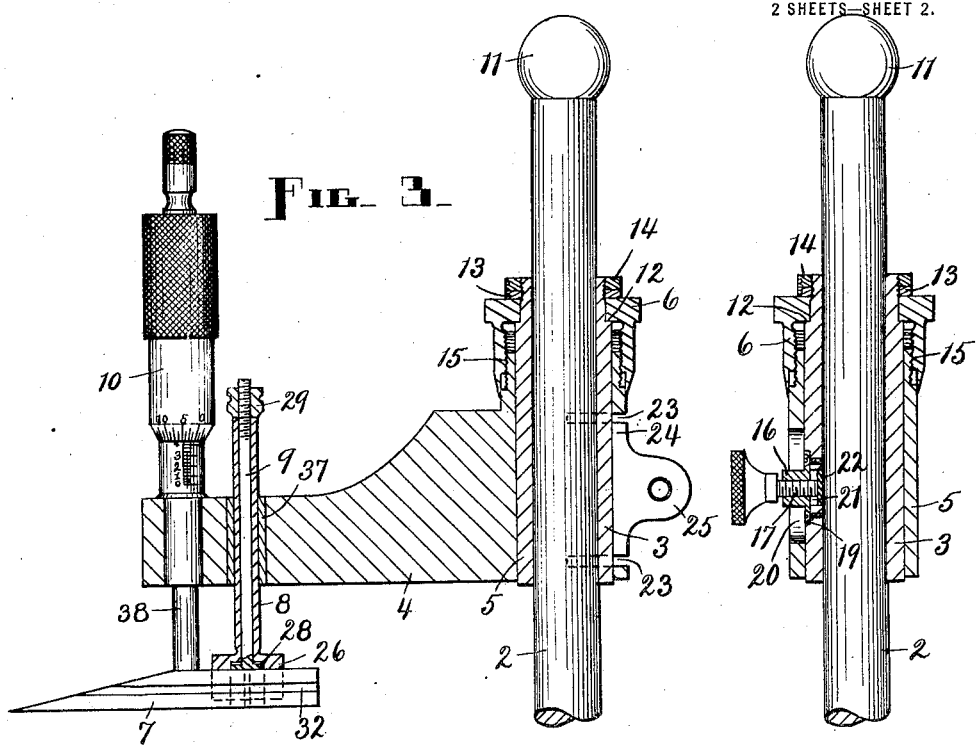
WITNESS:
A. C. Fairbanks.
INVENTOR.
Lyman E. Jennison,
BY
Frank A. Cutter,
ATTORNEY.

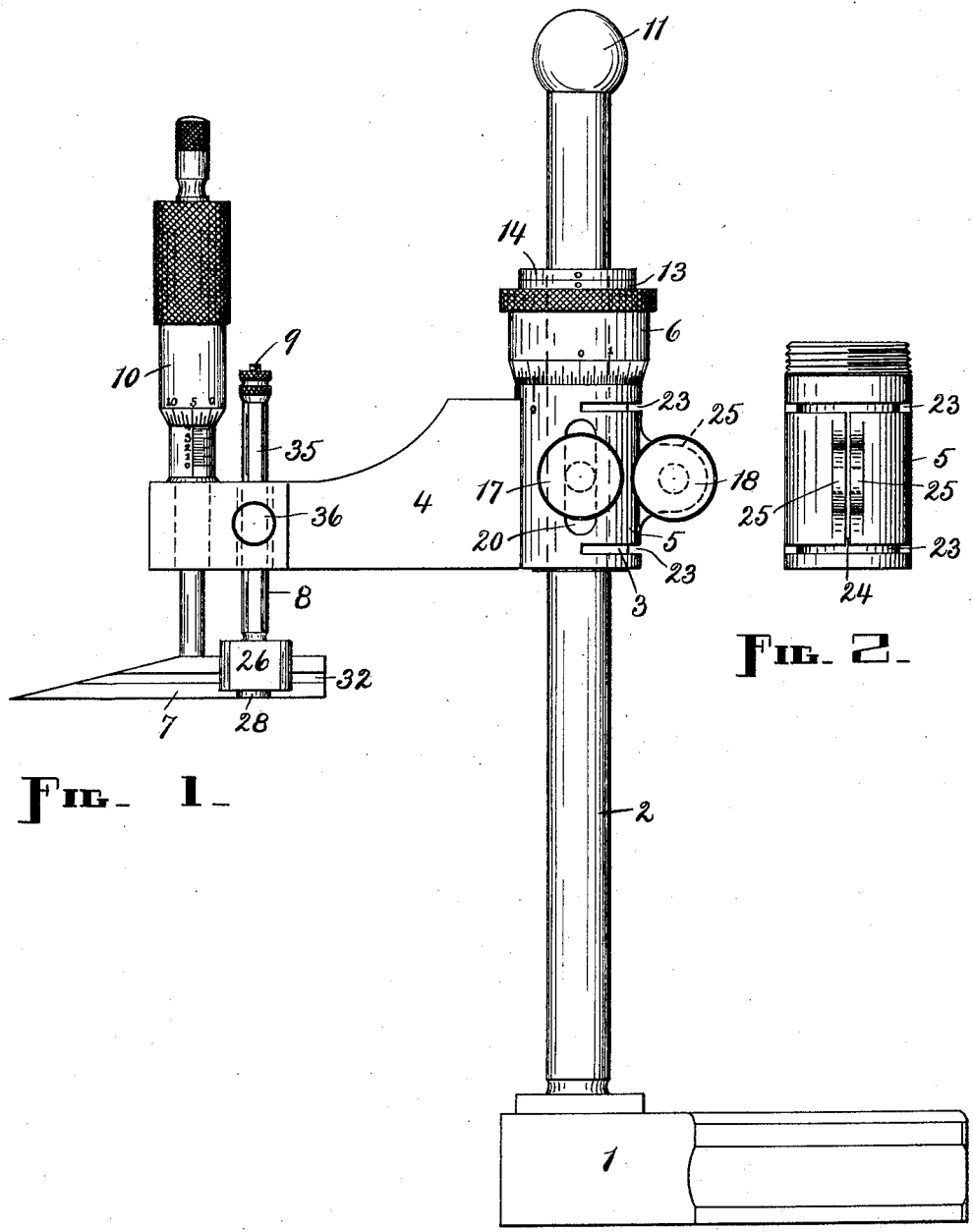

UNITED STATES PATENT OFFICE.

LYMAN E. JENNISON, OF WEST SPRINGFIELD, MASSACHUSETTS.

MICROMETER HEIGHT-GAGE.

1,390,618.  Specification of Letters Patent.  Patented Sept. 13, 1921.

Application filed July 10, 1920. Serial No. 395,302.

*To all whom it may concern:*

Be it known that I, LYMAN E. JENNISON, a citizen of the United States of America, and a resident of West Springfield, in the county of Hampden and State of Massachusetts, have invented a new and useful Micrometer Height-Gage, of which the following is a specification.

My invention relates to improvements in precision instruments for measuring heights, and for use in laying out jig, gage and other tool work, and which are commonly designated as micrometer height gages, and consists essentially of a vertical post, pillar, or shaft fixedly mounted on a base, a horizontal arm sleeved to said shaft and provided with means whereby said arm is rendered vertically and circumferentially adjustable, and can be locked to said shaft at any desired point, after being adjusted, said adjusting means including or consisting in part of means for making minute, vertical adjustments of said sleeve after the same has been moved for making major, vertical adjustments, and a scratch attachment carried by said arm, these members being of certain peculiar construction, together with an ordinary micrometer-head which is also carried by said arm, all as hereinafter set forth.

The primary object of my invention is to provide a micrometer height gage with scratch attachment which, while being comparatively simple in construction, easy to assemble, and convenient to use by mechanics and others for measuring the dimensions of articles in the course of or while in the process of manufacture, possesses great accuracy because of the provision whereby the finest and most delicate adjustments may be made, even to readings as fine as one tenthousandth of an inch.

Although this instrument is particularly useful for obtaining the height of and marking lines in laying out such work as templets, gages, and dies, and for obtaining the location of bushings in jigs, etc., it is applicable generally to the numerous uses for which implements of this character are designed.

A further object is to provide an instrument of this character which is practically without lost motion, due to the fact that provision is made for compensating for any and all wear that may occur from the use of the instrument, including the action of adjusting the same.

Other objects and advantages will appear in the course of the following description.

I attain the objects and secure the advantages of my invention by the means illustrated in the accompanying drawings, in which—

Figure 1 is a side elevation of a micrometer height gage, with scratch attachment, which embodies a practical form of my invention; Fig. 2, an end elevation of the arm detached showing the split sleeve with which said arm is provided, such elevation being taken at the sleeve end of the arm; Fig. 3, a central, vertical section through said gage, the shaft beneath the arm sleeve being broken off and the base omitted; Fig. 4, a similar section taken at right-angles to that shown in the preceding view, and looking toward the left; Fig. 5, a front end elevation of the scratcher or scriber with its supporting parts and members detached from said arm; Fig. 6, what may be termed a backside elevation of said scriber and supporting parts and members, and, Fig. 7, a bottom plan of said scriber and supporting parts and members.

Similar reference characters refer to similar parts throughout the several views.

Referring first more particularly to Fig. 1, it will be observed that the instrument comprises a base 1, an upright shaft 2 erected on said base near one end thereof and rigidly affixed thereto, a bushing 3 arranged for circumferential and vertical adjustment on said shaft, a horizontal arm 4 provided with a sleeve 5 which is mounted on said bushing, a gage-nut 6 also mounted on said bushing, and a scriber 7 supported from said arm by means of a vertical tubular member or sleeve 8 and a rod 9 in said last-named sleeve. An ordinary micrometer-head 10 also is supported by the arm 4, being mounted on and in the same, said micrometer-head being located adjacent to the outer or free end of said arm while the scriber sleeve 8 is located behind, inside, or to the right of said micrometer-head. The shaft 2 is provided on top with an enlargement or ball 11 to prevent the parts and members mounted on said shaft from being removed or becoming detached therefrom.

Referring now more particularly to Figs. 3 and 4, it will be seen that the bushing 3 has a shoulder 12 near the top or a short distance below said top, and that the upper extremity of said bushing is screw-threaded.

The gage-nut 6 is mounted on the shoulder 12, and held in place thereon by means of a nut 13 and a lock-nut 14 which engage the screw-threaded part of the bushing 3 above said gage-nut. The barrel of the gage-nut 6 extends downwardly over the upper part of the sleeve 5, and is in threaded engagement with such upper part of said sleeve, as represented at 15. There is an index or scale on the lower peripheral portion of the barrel of the gage-nut 6, which portion is tapered downwardly and inwardly, and one or more vertical zero marks are placed on the periphery of the sleeve 5, with which marks said scale coöperates to determine the amount of vertical adjustment imparted to said sleeve by said nut when the latter is turned, it being understood that said nut, held as it is against independent vertical movement by the shoulder 12 and the nuts 13 and 14, and being in threaded engagement with said sleeve, actuates the latter up or down, according to the direction in which the nut is turned.

In the absence of any restraining influence, the bushing 3 can be rotated and raised and lowered on the shaft 2, and the same thing would be true relative to the sleeve 5 and said bushing. Means to prevent the sleeve 5 from turning or rotating on the bushing 3 at any time, and other means to lock said sleeve to said bushing and the latter to said shaft, are provided, however, such means being releasable.

The means just referred to comprise a nipple 16, a thumb-screw 17, and a thumb-screw 18, together with the other elements described below. The nipple 16 is securely fastened by screws or other means to what may be termed the front side of the bushing 3, said nipple having a base or flange 19 for this purpose. There is a vertical slot 20 in the corresponding or front side of the sleeve 5 into and through which the nipple 16 extends. Said nipple fits snugly between the sides of the slot 20 and so prevents any independent circumferential movement between the bushing 3 and the sleeve 5, although the nipple may be moved vertically within the confines fixed by the ends of said slot. A recess 21 is formed in the bushing 3 between the inner face of the flange 19 and the adjacent side of the shaft 2. The thumb-screw 17 is tapped into and through the nipple 16, and a plate 22 is interposed between the inner end of said thumb-screw and the adjacent side of the shaft 2. Upon tightening the thumb-screw 17 the plate 22 is forced tightly against the shaft 2 and so locks the bushing 3 to said shaft and prevents the same from being moved thereon.

The sleeve 5, in the side which is opposite to the arm 4, has two horizontal slots 23 near the top and bottom, and a vertical connecting slot 24, therein. Each side of the slot 24 is a projection or lug 25, and the thumb-screw 18 passes through one of these projections or lugs and is tapped into the other. When the thumb-screw 18 is tightened the lugs 25 are drawn together and so cause the slotted portions of the sleeve 15 to bind on the bushing 3 and thus prevent said sleeve from being moved vertically thereon. Upon loosening the thumb-screw 18 the sleeve 5 with the arm 4 and the parts and members supported and carried thereby can be adjusted up and down on the bushing 3. The vertical adjustment of the sleeve 5 enables the scriber 7 to be located at any elevation within the range of the instrument, through the medium of the gage-nut 6, and after the bushing 3 has been vertically adjusted. When the gage-nut 6 is turned to the left the sleeve 5 with its parts and members is elevated, and when said nut is turned to the right said sleeve with its parts and members is moved downwardly. After these adjustments have been made the thumb-nut 18 is retightened. Upon loosening the thumb-nut 17 the bushing 3 with the sleeve 5 and other parts can be raised and lowered for the major adjustments vertically, and turned upon the shaft 2 to locate the scriber 7 at any desired point in a horizontal plane which is circumferential to said shaft. The thumb-screw 17 is then retightened, and the minor or finer, vertical adjustments are made with the gage-nut 6, after loosening the thumb-screw 18, in the manner just explained. Thus all possible, desired adjustments of the scriber 7 are made, so far as the members which are directly supported on and by the shaft 2 are concerned. It is usual to adjust the bushing 3 on the shaft 2 before adjusting the sleeve 5 on said bushing.

The sleeve 8 has a foot 26 at the base through which is a longitudinal slot 27 to receive the scriber 7, said slot opening through the bottom of said foot. The rod 9 has a foot 28 at the bottom, and is screw-threaded at the upper terminal to receive a thumb-nut 29 above the top of the sleeve 8. The foot 28 is cylindrical and fits into an enlarged portion of the slot 27 in the center of the foot 26. The foot 28 has a slot 30 therein, as clearly shown in Figs. 3 and 7, to accommodate the scriber 7, such slot opening through the bottom of said foot, just as the slot 27 opens through the bottom of the foot 26, and being in line with said last-named slot. On one side of the slot 30 is a lug 31 which is received in a longitudinal groove 32 in one side of the scriber 7, said lug being clearly shown in Fig. 5. The foot 28 is cylindrical and fits in an enlarged portion of the slot 27 in the center of the foot 26, and the construction and arrangement of parts are such that, when the thumb-nut 29 is tightened, the rod 9 and the foot 28 are drawn upwardly until the scriber 7 is clamped tightly against the top of the slot in the foot 26, and thus held against longitudinal movement, the lug 31 which is in the groove 32 in said scriber being instrumental in producing this result. There is a vertical slot 33 in the foot 28 to receive a horizontal pin 34 set in the side of the foot 26 which is on the opposite side of the scriber 7 from the lug 31, and said pin projects into the opening in said foot 26 which is provided for said foot 30. The inner end of the pin 34 being in the groove 33 prevents independent relative rotation on the part of the sleeve 8 and the rod 9. The lug 31 and the pin 34 are opposite to each other. The front side of the sleeve 8 is flattened or chamfered, as represented at 35, Fig. 1, and a thumb-screw 36 is tapped into the front side of the arm 4 to bear against said chamfered part of said sleeve, when said nut is tightened, for the purpose of holding said sleeve securely against rotation and vertical movement.

The scriber 7 is or may be introduced from either direction into the slots 27 and 30, while the thumb-nut 29 is loosened or after the same has been loosened, and then, after adjusting said scriber longitudinally to the required extent, said thumb-nut is screwed down tightly on top of the sleeve 8, with the result that the rod 9 with its foot 28 is drawn upwardly in the sleeve 8 and its foot 26 until said scriber is caused to bear tightly against the top of the slot 27, the top of the scriber coming into contact with the top of said slot before the top of the foot 28 comes into contact therewith. During the tightening of the thumb-nut 29, the rotation of the parts is prevented by means of the pin 34 which is in the foot 26 and projects into the groove 33 in the foot 28. The pin 34 does not interfere with the vertical movement of the foot 28, so that it is possible, in assembling the parts, to connect the scriber 7 with the foot 28 before introducing the rod 9 into the sleeve 8. The scriber can be adjusted longitudinally at any time by merely loosening the thumb-nut 29, moving said scriber in the feet 26 and 28, and retightening said thumb-nut.

After the scriber 7 has been adjusted longitudinally to the required extent, the desired amount of separation between said scriber and the arm 4 is obtained by loosening the thumb-screw 36, moving the sleeve 8 up or down as may be required in said arm and then retightening said thumb-screw.

A micrometer-head 10 is located in the arm 4 in front or to the left of the sleeve 8, and directly above the top of the scriber 7, behind or at the right of the inclined end thereof, so that said scriber when elevated is or may be brought into contact with the bottom of the spindle 38. The spindle 38 is raised or lowered by turning the micrometer-head 10, and according to the direction in which said head is rotated, and it is by this means that the distance of the scriber 7 from the arm 4 is determined and fixed.

A bushing 37 is provided in the arm 4 for the sleeve 8.

The scriber 7 is not always needed, and in such event the thumb-nut 29 is removed from the rod 9, so that the sleeve 8 can be drawn downwardly out of the opening therefor in the arm 4, and said sleeve with connected parts is so withdrawn from said arm.

The functions of the several elements of this instrument having been hereinbefore fully described, the general application and use of said instrument, for the many purposes for which an instrument of this character is adapted, will be understood, so that it is not deemed necessary to encumber this specification with concrete examples of application and use.

More or less change in the shape, size, construction, and arrangement of some or all of the parts of this instrument may be made without violating the spirit of my invention or exceeding the scope of what is claimed.

What I claim as my invention, and desire to secure by Letters Patent, is—

1. The combination, in a micrometer height gage, with a suitably supported shaft, a bushing mounted on said shaft for circumferential and vertical adjustment, said bushing being provided with a nipple, and a thumb-screw tapped into and through said nipple and adapted to bind said bushing to said shaft, of an arm having a sleeve mounted on said bushing, and means to bind said sleeve to said bushing.

2. The combination, in a micrometer height gage, with a suitably supported shaft, a bushing mounted for circumferential and vertical adjustment on said shaft, and means to bind said bushing to said shaft, of an arm provided with a sleeve which is mounted on said bushing, means to bind said sleeve to said bushing, and means mounted on said bushing to adjust said sleeve thereon when the same is loosened.

3. The combination, in a micrometer height gage, with a suitably supported shaft, a shouldered bushing mounted for circumferential and vertical adjustment on said shaft, said bushing being provided with a nipple, a thumb-screw tapped into and through said nipple to bind said bushing to said shaft, and a plate interposed between said shaft and the inner end of said thumb-screw, of an arm provided with a split sleeve mounted on said bushing, a thumb-screw arranged to bind said sleeve to said bushing, said sleeve being slotted to accommodate said nipple, a gage-nut mounted on the shoulder on said bushing, and nuts on said bushing to retain said gage-nut in place on said shoulder, said gage-nut being in threaded engagement with said sleeve.

4. The combination, in a micrometer height gage, with a suitably supported shaft, a bushing mounted for circumferential and longitudinal adjustment on said shaft, and means to bind said bushing to said shaft, of an arm provided with a sleeve split horizontally and vertically, and mounted on said bushing, said sleeve having lugs on the split portions thereof, and a thumb-screw engaging said lugs and adapted to bind said sleeve to said bushing.

5. The combination, in a micrometer height gage, with a suitably supported shaft, and an arm adjustably mounted on said shaft, of a vertical sleeve adjustable in said arm, said sleeve having a slotted foot, a rod extending through said sleeve and having a slotted foot, a scriber receivable in said feet, means to prevent relative rotation between said sleeve and rod, and a nut threaded to said rod above said sleeve, the construction and arrangement of parts being such that said scriber is drawn tightly against the top of the slot in said sleeve foot when said nut is tightened.

6. The combination, in a micrometer height gage, with a suitably mounted shaft, and an arm adjustably mounted on said shaft, of a sleeve arranged for vertical adjustment in said arm, said sleeve having a slotted foot, a rod receivable in said sleeve and having a slotted foot in said first-named foot, a grooved scriber receivable in the slots in said feet, said second-named foot having a lug to enter the groove in said scriber and itself having a groove therein, a pin in said first-named foot to enter the groove in said second-named foot and thereby prevent rotation of the parts, a thumb-nut threaded to said rod above said sleeve, the construction and arrangement of parts being such that said scriber is drawn tightly against the top of the slot in said sleeve foot when said nut is tightened, and means to bind said sleeve to said arm.

LYMAN E. JENNISON.

Witnesses:
F. A. CUTTER,
A. C. FAIRBANKS.